United States Patent
Galloway, Jr.

(10) Patent No.: US 11,275,725 B2
(45) Date of Patent: Mar. 15, 2022

(54) TRANSPORTING A DATABASE STRUCTURE FROM A FIRST VERSION TO A SECOND VERSION

(71) Applicant: salesforce.com, inc., San Francisco, CA (US)

(72) Inventor: John R. Galloway, Jr., Alameda, CA (US)

(73) Assignee: salesforce.com, inc., San Francisco, CA (US)

(*) Notice: Subject to any disclaimer, the term of this patent is extended or adjusted under 35 U.S.C. 154(b) by 99 days.

(21) Appl. No.: 16/775,968

(22) Filed: Jan. 29, 2020

(65) Prior Publication Data

US 2021/0232566 A1    Jul. 29, 2021

(51) Int. Cl.
*G06F 16/23* (2019.01)
*G06F 16/22* (2019.01)
*G06F 16/25* (2019.01)

(52) U.S. Cl.
CPC ........ *G06F 16/2372* (2019.01); *G06F 16/221* (2019.01); *G06F 16/2282* (2019.01); *G06F 16/258* (2019.01)

(58) Field of Classification Search
CPC .. G06F 16/2372; G06F 16/258; G06F 16/221; G06F 16/2282
See application file for complete search history.

(56) References Cited

U.S. PATENT DOCUMENTS

| | | | |
|---|---|---|---|
| 10,083,095 B1* | 9/2018 | Chopra | G06F 11/1464 |
| 10,810,248 B2* | 10/2020 | Tang | G06F 16/214 |
| 2014/0114913 A1* | 4/2014 | Engelko | G06F 16/119 707/609 |
| 2014/0172788 A1* | 6/2014 | Haase | G06Q 10/06 707/610 |
| 2016/0275160 A1* | 9/2016 | Motivala | G06F 9/4881 |
| 2018/0189370 A1* | 7/2018 | Bendel | G06F 16/2282 |
| 2019/0278862 A1* | 9/2019 | Kapoor | G06F 16/258 |

* cited by examiner

*Primary Examiner* — Dangelino N Gortayo
(74) *Attorney, Agent, or Firm* — Butzel Long; Donald J. Lecher

(57) ABSTRACT

Methods and systems are provided for copying one database to another, such as where a database is upgraded from an earlier version to a later version. Database catalog files are used to copy the database table definitions, with appropriate changes made as needed between the first and second databases or database versions.

18 Claims, 5 Drawing Sheets

FIG. 2

| table_desc | | | | |
|---|---|---|---|---|
| OID | table_name | columns | owner_oid | storage url |
| 1 | table_desc | 5 | 18 | ... |
| 7 | col_desc | 7 | 18 | |
| 15 | role_desc | 2 | 18 | |

| col_desc | | | | | | |
|---|---|---|---|---|---|---|
| OID | table_oid | col_name | ordinal | type | is_pk | ref_key_oid |
| 2 | 1 | OID | 1 | oid | TRUE | -- |
| 3 | 1 | table_name | 2 | char(15) | FALSE | -- |
| 4 | 1 | columns | 3 | int | FALSE | -- |
| 5 | 1 | owner | 4 | oid | FALSE | 17 |
| 6 | 1 | storage_url | 5 | char(500) | FALSE | -- |
| 8 | 7 | OID | 1 | oid | TRUE | -- |
| 9 | 7 | table_oid | 2 | oid | FALSE | 3 |
| 10 | 7 | col_name | 3 | char(15) | FALSE | -- |
| 11 | 7 | ordinal | 4 | int | FALSE | -- |
| 12 | 7 | type | 5 | type | FALSE | -- |
| 13 | 7 | is_pk | 6 | boolean | FALSE | -- |
| 14 | 7 | ref_key_oid | 7 | oid | FALSE | -- |
| 16 | 15 | OID | 1 | oid | TRUE | -- |
| 17 | 15 | role_name | 2 | char(15) | FALSE | -- |

| role_desc | |
|---|---|
| OID | role_name |
| 18 | system |

FIG. 3

| table_desc | | | | |
|---|---|---|---|---|
| OID | table_name | columns | owner_oid | storage url |
| 1 | table_desc | 5 | 18 | |
| 7 | col_desc | 7 | 18 | |
| 15 | role_desc | 2 | 18 | |
| 1001 | customer_information | 7 | 1000 | |

| col_desc | | | | | | |
|---|---|---|---|---|---|---|
| OID | table_oid | col_name | ordinal | type | is_pk | ref_key_oid |
| 2 | 1 | OID | 1 | oid | TRUE | -- |
| 3 | 1 | table_name | 2 | char(15) | FALSE | -- |
| 4 | 1 | columns | 3 | int | FALSE | -- |
| 5 | 1 | owner | 4 | oid | FALSE | 17 |
| 6 | 1 | storage_url | 5 | char(500) | FALSE | -- |
| 8 | 7 | OID | 1 | oid | TRUE | -- |
| 9 | 7 | table_oid | 2 | oid | FALSE | 3 |
| 10 | 7 | col_name | 3 | char(15) | FALSE | -- |
| 11 | 7 | ordinal | 4 | int | FALSE | -- |
| 12 | 7 | type | 5 | type | FALSE | -- |
| 13 | 7 | is_pk | 6 | boolean | FALSE | -- |
| 14 | 7 | ref_key_oid | 7 | oid | FALSE | -- |
| 16 | 15 | OID | 1 | oid | TRUE | -- |
| 17 | 15 | role_name | 2 | char(15) | FALSE | -- |
| 1002 | 1001 | OID | 1 | oid | TRUE | -- |
| 1003 | 1001 | PK | 2 | int | TRUE | |
| 1004 | 1001 | last_name | 3 | char(100) | FALSE | |
| 1005 | 1001 | first_name | 4 | char(100) | FALSE | |
| 1006 | 1001 | street_address | 5 | char(100) | FALSE | |
| 1009 | 1001 | city | 6 | char(100) | FALSE | |
| 1010 | 1001 | state | 7 | char(100) | FALSE | |
| 1011 | 1001 | zip | 8 | int | FALSE | |

| role_desc | |
|---|---|
| OID | role_name |
| 18 | system |
| 1000 | IT_staff |

FIG. 4

| table_desc | | | | |
|---|---|---|---|---|
| OID | table_name | columns | owner_oid | storage url |
| 1 | table_desc | 5 | 18 | |
| 7 | col_desc | 7 | 18 | |
| 15 | role_desc | 2 | 18 | |
| 1001 | customer_information | 7 | 1000 | |

| col_desc | | | | | | |
|---|---|---|---|---|---|---|
| OID | table_oid | col_name | ordinal | type | is_pk | ref_key_oid |
| 2 | 1 | OID | 1 | oid | TRUE | -- |
| 3 | 1 | table_name | 2 | char(15) | FALSE | -- |
| 4 | 1 | columns | 3 | int | FALSE | -- |
| 5 | 1 | owner | 4 | oid | FALSE | 17 |
| 6 | 1 | storage_url | 5 | char(500) | FALSE | -- |
| 8 | 7 | OID | 1 | oid | TRUE | -- |
| 9 | 7 | table_oid | 2 | oid | FALSE | 3 |
| 10 | 7 | col_name | 3 | char(15) | FALSE | -- |
| 11 | 7 | ordinal | 4 | int | FALSE | -- |
| 12 | 7 | type | 5 | type | FALSE | -- |
| 13 | 7 | is_pk | 6 | boolean | FALSE | -- |
| 14 | 7 | ref_key_oid | 7 | oid | FALSE | -- |
| 16 | 15 | OID | 1 | oid | TRUE | -- |
| 17 | 15 | role_name | 2 | char(15) | FALSE | -- |
| 1002 | 1001 | OID | 1 | oid | TRUE | -- |
| 1003 | 1001 | PK | 2 | int | TRUE | |
| 1006 | 1001 | street_address | 5 | char(100) | FALSE | |
| 1009 | 1001 | city | 6 | char(100) | FALSE | |
| 1010 | 1001 | state | 7 | char(100) | FALSE | |
| 1011 | 1001 | zip | 8 | int | FALSE | |
| 1012 | 1001 | country | 9 | char(2) | FALSE | |
| 1013 | 1001 | cust_name | 3 | char(100) | FALSE | |

| role_desc | | |
|---|---|---|
| OID | role_name | role_level |
| 18 | system | 99 |
| 1000 | IT_staff | 5 |

TRANSPORTING A DATABASE STRUCTURE FROM A FIRST VERSION TO A SECOND VERSION

BACKGROUND

A database can be an organized collection of data that can be stored and that accessed through control circuitry controlled by a processor. Typically a database management system is used to access the data stored in the database. In a relational database, data is stored in such a way that it can be presented to users as a set of interrelated tables. Each table may define collection of data in which a set of one or more specific types of data related to one or more entities can be arranged. Typically new records are created in the database by creating new rows in one or more tables. Database systems and database management systems typically also provide a table catalog, which includes one or more tables that store the meta-data that describes the structures of the tables used in the database. As tables are modified or added to a particular database, the catalog may be updated by the database management system to reflect the changes.

BRIEF DESCRIPTION OF THE DRAWINGS

The accompanying drawings, which are included to provide a further understanding of the disclosed technologies, are incorporated in and constitute a part of this specification. The drawings also illustrate implementations of the disclosed technologies and together with the detailed description serve to explain the principles of implementation of the disclosed technologies. No attempt is made to show structural details in more detail than may be necessary for a fundamental understanding of the disclosed technologies and the various ways in which it can be practiced.

FIG. 2 shows a database application catalog after the initial tables have been created but before they have been used by the application according to the subject matter disclosed herein.

FIG. 3 shows the same catalog as FIG. 2 after use by the application according to the subject matter disclosed herein.

FIG. 4 shows the same catalog as FIG. 2 after further use by the application, according to the subject matter disclosed herein.

DETAILED DESCRIPTION

A "database application" typically is a software application that accesses an application database during its execution. An "application database" refers to the set of tables used by the application, which generally will be hosted on and managed by a database and database management system, which may contain many such application databases. In some cases, the database may include multiple copies of the same set of tables, each of which is used by a different application. For example, a computerized commerce platform may provide a customer relationship management (CRM) application, which users of the platform can implement within their own systems. Each user may have their own database that is accessed by the application, such that the data stored in each user's database tables are not accessible to other users of the platform. When first created, each database may have the same structure that is appropriate for the CRM application. In some cases, users may modify the tables through use of the application or directly, such as where each user stores different customer information.

More generally, a database application may use a standardized initial set of tables within a database, in which the application adds, modifies, and deletes data during execution of the application by one or more users. As the application is used, the tables may be modified, such as to include additional columns, to change the type of a column, to add or remove entire tables, or the like.

Further, different versions of the application may have different tables and/or different table structures. For example, a later version of the application may include additional data that is stored in a new table that did not exist in an earlier version of the application, or the structure of tables may be changed between versions of the application. Such tables typically are user-level tables ("user tables"), rather than the system-level tables of the database catalog.

Database management systems often provide various techniques, commands, and interfaces to move or copy a database from one database system to another, and/or to transition a database from one version of the database to another. For example, many structured query language (SQL)-based systems provide a "table dump" functionality that generates one or more SQL data description language (DDL) statements needed to entirely recreate the application database in a new, "fresh" database that has not yet been configured for the application or has not yet been used by the application. For complex databases, it may require significant computing and time resources for the management system to generate the appropriate SQL statements, often taking several hours of time during which the database may be locked from other changes.

Embodiments disclosed herein provide techniques and systems for copying, moving, and/or changing a version of a database, without requiring the computing and time resources typically needed for such operations.

Figure 1:
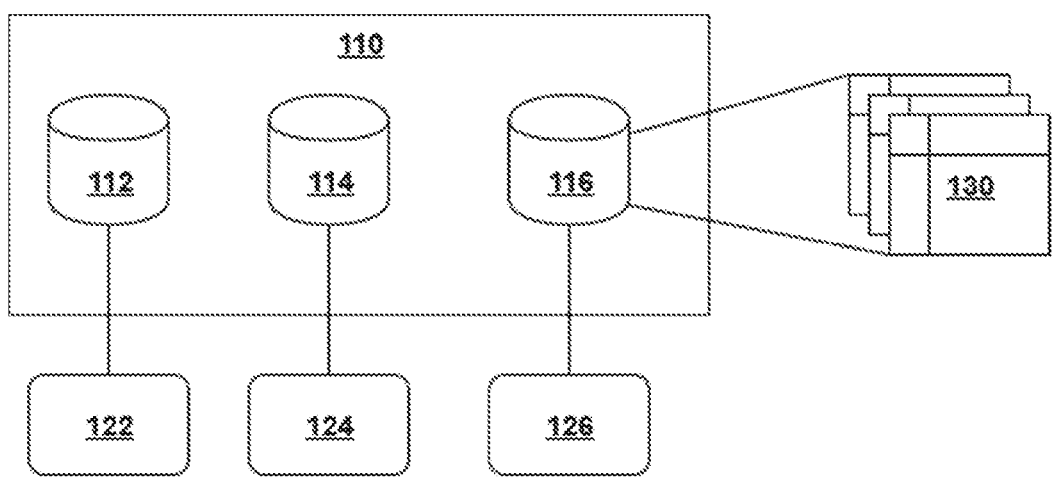
FIG. 1 shows an example database application system according to the subject matter disclosed herein.

FIG. 1 shows an example system according to the disclosed subject matter. A database management system 110 may include multiple databases 112, 114, 116. The databases 112, 114, 116 may have the same or different database structures, which may be defined by the application or applications that access each database. Each database stores data in one or more tables 130, with each database having its own set of tables. Generally each database will not have direct access to the tables of any other database. In this example, each database 112, 114, 116 has one or more applications 122, 124, 126, respectively, which stores data in the database. More generally, one or more applications may access one or more databases, and any arrangement of applications and databases may be used without departing from the scope or content of the present subject matter. During operation, one or more users may access the database applications 122, 124, 126 and perform operations defined by those applications. The use of the applications may result in data being added to, modified, or removed from the associated database. In some cases, the applications and/or the users also may modify the database structures themselves, such as by adding or modifying a column, creating a new table, or the like. Generally each application and database combination is independent and distinct relative to the others, although they may be separate instances of the same application and database. For example, applications 122, 124 may be separate instances of the same inventory tracking application, so that the initial database structures 112, 114, respectively, are the same. However, during use of the applications 122, 124 the data in each database 112, 114 will be different. Further, the database structures also may become different over time, such as where one instance of the application is upgraded to a newer version while the other is not. Similarly, each application may have multiple versions, each of which may use the same or different versions of the associated database. The techniques disclosed herein are concerned with moving a first database to a second database, where the second database may have a different system-level structure than the first. That is, the structure of user tables may be preserved from the first database to the second, whereas system tables defined in the database catalog will be modified to match those of the second database, if different than the first.

As a specific illustrative example, database application 126 may be a CRM application that stores customer preferences, sales records, and the like in one or more tables 130 of database 116. During operation of the application 126, data may be added to the user database tables 130 by the application 126. As a specific example, customer information including name, address, email address, and shipping preference may be stored in a "customer" table 130 in the database 116. During operation of the application 126, customer data obtained from one or more users of the application may be stored in the customer table. If, at a later time, the application is updated to allow for capturing customer phone numbers or a user of the application expands the capabilities of the application to do the same (such as by defining a custom data field), a new table may be added to the database or a new column may be added to the existing customer table to store this information. Accordingly, the structure of the user database tables 130 may change over the lifetime of the application, or when the application is upgraded to a new version.

Information about the tables in a database may be stored in the database itself, such as in a database catalog. FIG. 2 shows an example catalog for a new instance of a first application version, i.e., before it has been used. The catalog identifies and describes three tables: a table descriptor table ("table_desc"), a column descriptor table ("col_desc"), and a role descriptor table ("role_desc"). The three tables shown in this example are illustrative only, and generally a database will have tens, hundreds, or more tables, though the same principles and operations disclosed herein may be applied to any number of tables in a database. In this example, the table descriptor table lists a unique identifier (OID), table name, number of columns, owner ID, and storage URL for each table. The three tables of the example are shown. For example, the column descriptor table has an OID of 7, is named "col-desc", has seven columns, and is owned by the user with OID 18. As shown by the role descriptor table, user OID 18 corresponds to the "system" role. Other information may be included in such a table. For example, the "storage_url" field may provide a link or other pointer to the physical or logical address at which the table is stored in memory of the database system. Many other columns may be included in a table catalog, and the principles and operations disclosed herein may be used and apply equally to any number of catalog tables having any number of columns.

Continuing the example, the column descriptor table provides information on all columns in all tables of the database, including the table descriptor and column descriptor tables themselves, as shown. In this example, the column descriptor table shows the OID, table OID, column name, column order in the table ("ordinal"), column type, an indication of whether the column represents a primary key for the table ("is_pk"), and an indication of whether the column is used to enforce referential integrity within the table and, if so, the associated OID ("ref_key_OID"). Such data types and descriptions are typical of those used in relational database systems and will be readily understood by one of skill in the art. Many other tables may be included in the catalog, such as the role descriptor table that lists user roles that can be used in the associated application. Finally the role descriptor table, "role_desc", lists the known roles within the application. At the point shown in FIG. 1, i.e., when the application has not been used and thus has not created data or modified the table structure of the database, only the "system" role exists, as shown.

As previously disclosed, the structure of user tables in the database shown in FIG. 2 may change as the database is used by an associated application, or when the application and database are upgraded or downgraded to a different version. In this example, as shown in FIG. 3, a new table, customer_information, has been added, as shown by the new row in the table_desc table. For example, the customer_information table may be created when a user of the associated application first creates customer data within the application, which is then stored in the database. As another example, a new version of the associated application may have been released that uses the new table as a base table that is created when a new instance of the application and database is first created. As another example, the customer_information table may be created by the user during use of the application, such as via an interface that allows users of the application to create new data structures to store data used by the application, which then causes the application to create corresponding tables, or modify existing tables, to store data for which the new data structure was created. However, such changes do not affect the structure of the system-level tables in the table catalog, which are defined by the version and system of the database and generally are not modified due to use of the database by an application.

As with the initial catalog tables in FIG. 2, the col_desc table stores descriptions of the columns associated with the new customer information table. In this example, as shown in FIG. 3, the new table includes columns to store identifiers (OID), a primary key (PK), and customer last names, first names, and addresses. As shown in FIG. 3, the OIDs may be assigned to correspond to the related table, such as where columns in the customer_information table (OID 1001) are assigned OIDs beginning at 1002. Such correspondence is not integral to operation of the technologies disclosed herein and more generally any table structures and correspondences may be used.

The updated catalog also shows an additional role has been added to the role descriptor table, "IT_staff." More generally, any new tables, rows, columns, or combinations thereof may be added, or any changes may be made to existing tables. FIG. 4 shows another version of the table catalog. Continuing the example, in this version the last_name and first_name columns in the customer_information table have been replaced by a cust_name column (OID 1013) as shown in the col_desc table, and a new column, country (OID 1012) has been added. As such, between the versions of the database shown in FIG. 3 and FIG. 4, the customer_information table has been changed by the addition and removal of columns. Generally such changes also will be accompanied by changes to the stored data and the way it is accessed by the associated application. In this example, the application may have been modified to treat customer names as unitary text strings, instead of separate first and last name string, which change is reflected by the changes to the customer_information table described above and shown in the change from FIG. 3 to FIG. 4. As with the change from the database structure shown in FIG. 2 to that of FIG. 3, the changes reflected between FIGS. 3 and 4 may occur due to a change in version of the associated application, a modification made by or via the application, or combinations thereof. As shown, the catalog tables may also include updated data to reflect changes to the user tables, such as the change to the customer_information user table. However, this does not reflect a change to the structure of the catalog table, only to the data stored in the table (due to changes to the customer_information table).

Whereas the change to the customer_information table reflects a change to the structure of a user table, FIG. 4 also shows a change to one of the catalog tables itself. In this case, a column has been added to the role_desc table, "role_level," which is not present in the other version of the database as described by the catalog tables shown in FIG. 3. Notably, the change to the role_desc table represents an alteration of the basic database structure since role_desc is a catalog table, whereas the customer_information table is a user table and, therefore, it is expected that it may be modified by user applications. As previously disclosed, the change to the role_desc table generally is not associated with use of the database by the application or any user action within the application or the database, but rather with the version of the database or the database system on which the database is implemented.

There are often times when it is desirable to move a database from one database system to another, or to replicate an application and/or database instance, or to change the version of a database. For example, in a geographically-distributed database-based software system such as a cloud-hosted system, it may be desirable to maintain the database in a physical location that is relatively close to a user of the application, or a majority of users of the application. As another example, in a similar system it may be desirable to maintain multiple instances of the database for a single application so that users in different geographic locations experience low latency when accessing the application. As another example, it may be desirable to create a new instance of a database application and the associated database and copy an existing data and database structure to the new instance. As another example, applications and associated databases are often modified when moving from one version to another, in which case it is desirable to upgrade the existing database while maintaining all the data stored therein, or to create a new instance of the application and database with the new version database structure, and subsequently copy the data and any custom data structures from the current version to the upgraded version.

To make such a change or to copy a database from one location to another, relational database management systems often provide a mechanism to automatically generate the SQL statements or equivalent commands to reconstruct all tables in the existing database from scratch. However, such a technique can be very time consuming and may require a large amount of computing resources as previously disclosed. In contrast, embodiments disclosed herein rely on the observation that the catalog tables themselves can be exported and used to recreate the entire database structure, without requiring the same "dump" of individual table structures.

Figure 5:
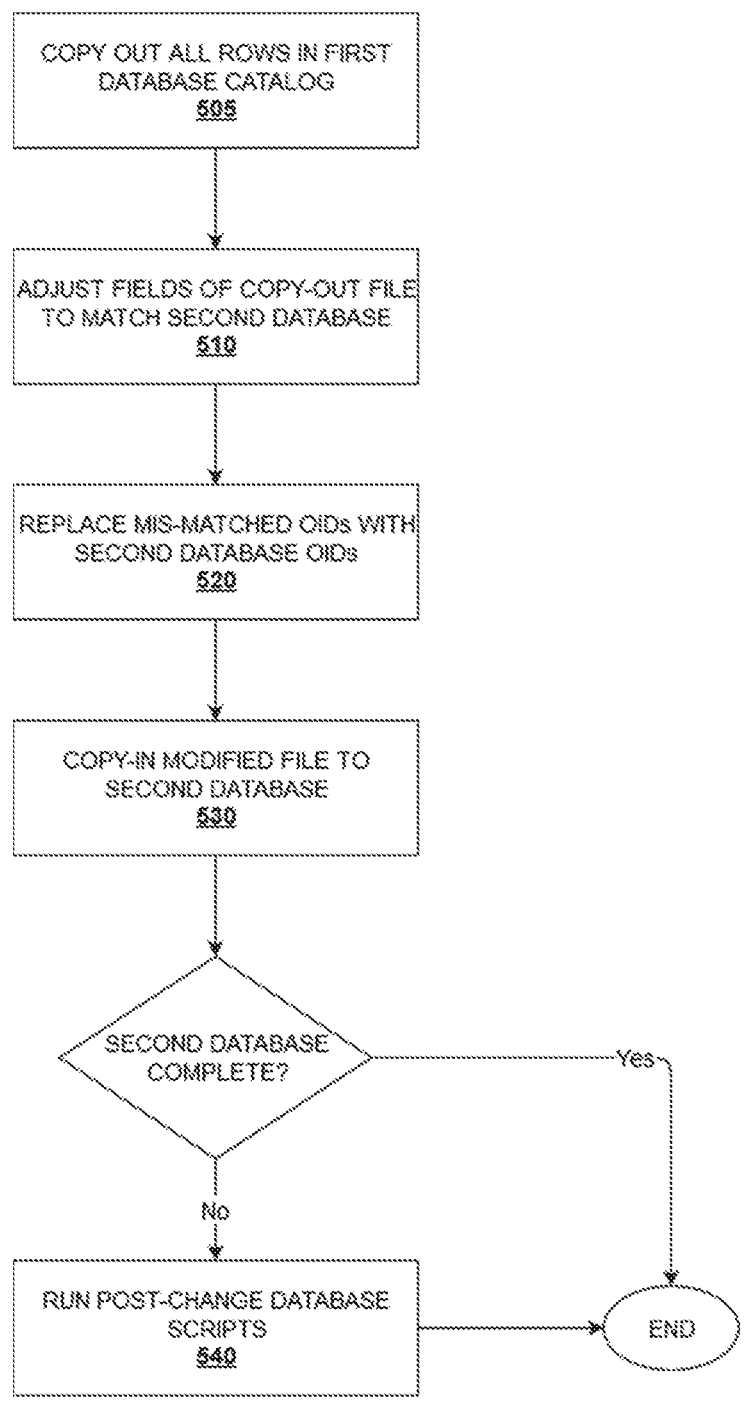
FIG. 5 shows an example process for moving data from one database to another according to the subject matter disclosed herein.

FIG. 5 shows an example process for copying an existing database structure from a first database to a second database. The first database may be, for example, a first version of a database as previously disclosed, and the second database may be, for example, a second version of a database as previously disclosed. The second database may be an empty database, or it may be an "initial" or "fresh" database associated with a new instance of the associated application and/or database that has not yet been used, such as the database structure shown in FIG. 2, which does not include any user tables or data.

At 505, all rows in the first database catalog may be copied to a file, such as using a "copy out" function of the database management system. The copy-out file may be, for example, a plain text or character-delimited file that stores the data of the catalog table. For example, referring to the version of the example table descriptor table shown in FIG. 3, a resulting copy-out file may include the following text:

OID, table_name, columns, owner_oid, storage url
1, table_desc, 5, 18,
7, col_desc, 7, 18,
15, role_desc, 2, 18,
1001, customer_information, 7, 1000, Similar text may be copied out for each table in the database catalog. Although shown and described as being stored in a plaintext file, any known and suitable storage format may be used for the copy-out file obtained from the first database. The system OIDs (for table_desc, col_desc, and role_desc in this example) may be omitted from the file, or they may be removed in a subsequent alteration step as disclosed in further detail below. This is because the new database system or version may assign different OIDs to these items. In contrast, user table OIDs (customer_information in this example) may be maintained so that they are copied to the second database.

At 510, the number of fields in the copy-out file may be modified to match fields in the second database. For example, empty fields for new columns may be added and null fields for dropped columns may be removed. For example, a copy-out file may be made for the structure shown in FIG. 3, where a database having the FIG. 3 structure is being modified to the have the structure shown in FIG. 4. As previously noted, when transitioning from one database system or version to another, only changes to the catalog tables (the database meta-data) are accounted for, because the user tables will not be present in a new instance or "fresh" install of the second database. In contrast, the process disclosed herein preserves the structure of user tables when moving from one database system or version to the next.

At 520, OIDs in the copy-out file may be updated to match the second database OIDs, for example, by replacing all occurrences of first database OIDs with corresponding second database OIDs. This may be done, for example, with a mapping table that matches OIDs in the first database to OIDs in the second database. The map may be automatically generated, for example, by comparing the catalog state, catalog table names, and initialization data of the first and second databases. In some cases, a human operator may provide or verify the OID mapping, but generally it may be performed automatically by the database management system or a host platform such as a cloud database that provides the database application and database management system. Notably, these modifications may be made only to catalog tables as previously indicated, so that user table structure is maintained during the transition from one database to another. Continuing the previous example, the changes to the customer_information table will not be reflected in any change to the copy-out file, whereas the change to the role_desc table will be addressed since it is a catalog table.

At 530, the copy-out file may be used to modify the second database, such as by importing the rows defined in the copy-out file. A copy-in or similar function within the database management system may be used to import the data. For example, the rows of each table defined in the copy-out file may be appended to the same existing table in the second database. Alternatively, where the table does not exist in the second database, the existing rows may be used to create a new table, in part by creating the appropriate row in the row_desc table or equivalent.

For example, where the process is copying the first database to a new system but there are no version changes to be implemented, the process may simply copy out all rows from the first database catalog tables and append them to a new, fresh instance of the database, i.e., a copy before it has been used by the application such as the example shown in FIG. 2. In this case the new copied-to database will be an exact copy of the first database. Referring to the previous examples of FIGS. 2-4, for example, to make a copy of a database having a structure as shown in FIG. 3, all rows with a table-descriptor OID of 1000 or greater may be copied out at 510 and appended to a database having a structure as shown in FIG. 2 at 530, with no operations needed at step 520. Alternatively, if the database is being copied to a later version, the OIDs may be different and the mapping of step 520 may be performed. In some cases, changes to the database other than changes to the catalog may require the system OID mapping process. For example, database functions used in view definitions often may be stored in the catalog as an OID. So if the OIDs change from one system to another, which is often the case, then the system OIDs used to identify such functions also may change. Notably, no user OIDs are modified during the OID mapping since there are no user OIDs in the new database system yet.

If there are no catalog schema changes between the first database and the second database, such as where they represent a relatively minor version change for the database that did not involve a schema change, the second database may be complete after step 530 and the process may end.

In some cases additional post-copy processing may be used to make any content changes that occurred between the first database and the second database. These may be performed, for example, using conventional DDL/SQL statements or scripts so that the end result second database will have an identical structure and content to the result that would be achieved if the first database was recreated from scratch using DDL commands or scripts. For example, it may be more efficient to add a single new column or make a data type change to an existing column using a relatively simple DDL script rather than making the changes during the copy-out/copy-in process of 510-530. After step 530 or 540 (if used), data may be copied from the first database to the second database.

Various techniques for upgrading a database from a first version to a second version can include or be implemented in the form of computer-implemented processes and apparatuses for practicing those processes. Techniques also can be implemented in the form of a computer program product having computer program code containing instructions stored in non-transitory and/or tangible media, such as floppy diskettes, compact disc read-only memories (CD-ROMs), hard drives, universal serial bus (USB) drives, or any other machine readable storage medium, wherein, when the computer program code is loaded into and executed by a computer, the computer becomes an apparatus for practicing techniques for upgrading a database from a first version to a second version.

Techniques also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing techniques for upgrading a database from a first version to a second version.

When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions.

Techniques can be implemented using hardware that can include a processor, such as a general-purpose microprocessor and/or an application-specific integrated circuit (ASIC) that implements all or part of the techniques according to implementations of the disclosed technologies in hardware and/or firmware. The processor can be coupled to memory, such as random-access memory (RAM), read-only memory (ROM), flash memory, a hard disk or any other device capable of storing electronic information. The memory can store instructions adapted to be executed by the processor to perform the techniques for upgrading a database from a first version to a second version.

As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

The foregoing description, for purpose of explanation, has been described with reference to specific implementations. However, the illustrative discussions above are not intended to be exhaustive or to limit implementations of the disclosed to the precise forms disclosed. Many modifications and variations are possible in view of the above teachings. The implementations were chosen and described in order to explain the principles of the techniques of the disclosed technologies and their practical applications, thereby to enable others skilled in the art to utilize those implementations as well as other various implementations with various modifications as may be suited to the particular use contemplated.

The invention claimed is:

1. A method for using a first database comprising a first plurality of database tables to create a second database comprising a second plurality of database tables, the method comprising:
   obtaining a first database catalog for the first database, the first database catalog comprising a plurality of first catalog tables that define a structure of the first plurality of database tables of the first database;
   copying all rows of each of the plurality of first catalog tables of the first database catalog to a copy-out file;

modifying the copy-out file to replace one or more unique first identifiers defined in the first database with one or more unique second identifiers defined in the second database;

based on the copy-out file, appending at least one row to a plurality of second catalog tables in the second database, the at least one row corresponding to a copied row defined in the copy-out file;

importing the copied rows of each of the plurality of first catalog tables of the first database catalog of the copy-out file to the second plurality of database tables; and importing data from the first database into the second database based on the imported rows in the second plurality of database tables.

2. The method of claim 1, wherein the second database has a structure used by a later version of an application that uses the structure of the first database.

3. The method of claim 1, further comprising:
adjusting fields defined in the copy-out file by inserting blank fields for columns defined in the second database that are not defined in the first database.

4. The method of claim 3, further comprising:
adjusting fields defined in the copy-out file by removing empty fields for columns that are defined in the first database that are not defined in the second database.

5. The method of claim 1, further comprising:
adjusting fields defined in the copy-out file by removing empty fields for columns that are defined in the first database that are not defined in the second database.

6. The method of claim 1, further comprising, after appending rows to a plurality of second catalog tables in the second database, executing one or more commands to modify the structure of the second database by adding, removing, and/or modifying one or more tables, columns, rows, or a combination thereof.

7. The method of claim 1, wherein the second database is a copy of the first database.

8. The method of claim 7, wherein the second database is executed by a different computing platform than the first database.

9. The method of claim 8, where the different computing platform is hosted by a common cloud-based platform.

10. A system comprising:
a first database comprising a first plurality of database tables;
a processor in communication with the database; and
a computer-readable medium in communication with the processor and storing instructions which, when executed by the processor, cause the processor to:
obtain a first database catalog for the first database, the first database catalog comprising a plurality of first catalog tables that define a structure of a plurality of database tables in the first database, including the plurality of first catalog tables;
copy all rows of each of the plurality of first catalog tables of the first database catalog to a copy-out file;
modify the copy-out file to replace one or more unique first identifiers defined in the first database with one or more unique second identifiers defined in the second database;
based on the copy-out file, append at least one row to a plurality of second catalog tables in the second database, the at least one row corresponding to a copied row defined in the copy-out file;
importing the copied rows of each of the plurality of first catalog tables of the first database catalog of the copy-out file to the second plurality of database tables; and
importing data from the first database into the second database based on the imported rows in the second plurality of database tables.

11. The system of claim 10, wherein the second database has a structure used by a later version of an application that uses the structure of the first database.

12. The system of claim 10, the instructions further causing the processor to:
adjust fields defined in the copy-out file by inserting blank fields for columns defined in the second database that are not defined in the first database.

13. The system of claim 12, the instructions further causing the processor to:
adjust fields defined in the copy-out file by removing empty fields for columns that are defined in the first database that are not defined in the second database.

14. The system of claim 10, the instructions further causing the processor to:
adjust fields defined in the copy-out file by removing empty fields for columns that are defined in the first database that are not defined in the second database.

15. The system of claim 10, the instructions further causing the processor to, after appending rows to a plurality of second catalog tables in the second database, execute one or more commands to modify the structure of the second database by adding, removing, and/or modifying one or more tables, columns, rows, or a combination thereof.

16. The system of claim 10, wherein the second database is a copy of the first database.

17. The system of claim 16, wherein the second database is executed by a different computing platform than the first database.

18. The system of claim 17, where the different computing platform is hosted by a common cloud-based platform.

* * * * *